US005797312A

United States Patent [19]

Brant

[11] Patent Number: 5,797,312

[45] Date of Patent: Aug. 25, 1998

[54] MICROWAVE STEAM CHAMBER COOKER

[76] Inventor: Dody Lynn Brant, Rd. #1, Box 167, Berlin, Pa. 15530

[21] Appl. No.: 535,943

[22] Filed: Sep. 28, 1995

[51] Int. Cl.[6] ................................ H05B 6/80; A47J 37/12

[52] U.S. Cl. ............................ 99/415; 99/418; 99/421 V; 99/DIG. 14; 99/441; 219/731

[58] Field of Search .............................. 99/415, 418, 419, 99/421, 451, DIG. 14, 426, 441; 219/731, 732, 734, 735

[56] References Cited

U.S. PATENT DOCUMENTS

| | | | |
|---|---|---|---|
| 3,143,059 | 8/1964 | Sofio | 99/415 X |
| 4,532,397 | 7/1985 | McClelland | 219/732 X |
| 4,558,197 | 12/1985 | Wyatt | 219/732 |
| 4,735,135 | 4/1988 | Walker | 99/241 V X |
| 5,213,776 | 5/1993 | Maniero et al. | 219/732 X |
| 5,310,981 | 5/1994 | Sarnoff et al. | 219/731 |

FOREIGN PATENT DOCUMENTS

| | | | |
|---|---|---|---|
| 0140513 | 5/1990 | Japan | 219/731 |
| 0005770 | 4/1887 | United Kingdom | 99/418 |

*Primary Examiner*—Reginald L. Alexander
*Attorney, Agent, or Firm*—Dwight G. Diehl, Esq.

[57] ABSTRACT

An assembly of elements is provided for cooking elongated foods in a microwave. The assembly having a lid, a base and a tray. Food is placed on the tray which is then placed on the base. The base contains a steam producing liquid at a level below the bottom of the tray. The lid placed on the base covering the tray and food. The assembly is then placed in a microwave. As the liquid is heated, steam passes through the tray, through apertures, over the food and out the lid.

8 Claims, 5 Drawing Sheets

MICROWAVE STEAM CHAMBER COOKER

BACKGROUND OF THE INVENTION

1. Field of Invention

The present invention concerns a universal steam cooker for use in a microwave. This cooker may be used to cook a variety of foodstuffs via microwave energy.

2. Description of the Prior Art

U.S. Pat. No. 4,923,704 describes a kit cooking food in a microwave, and utilizes various elements to perform the cooking.

U.S. Pat. Nos. Des. 258,106 and Des. 339,713 show hot dog steamers.

STATEMENT OF THE PRESENT INVENTION

According to the present invention, a microwave cooking device, for cooking elongated foods is provided which includes three members:

a lid for covering the food to be cooked;

a base member for holding a microwavable, steam producing liquid; and a tray member for holding or supporting the food to be cooked.

Said elements fitting together so that the food to be cooked is placed on the tray, the tray is placed on the base above the liquid, the lid is placed on the base covering the food and tray, and the entire unit placed in a conventional microwave oven.

DETAILED DESCRIPTION OF THE INVENTION

Figure 1:
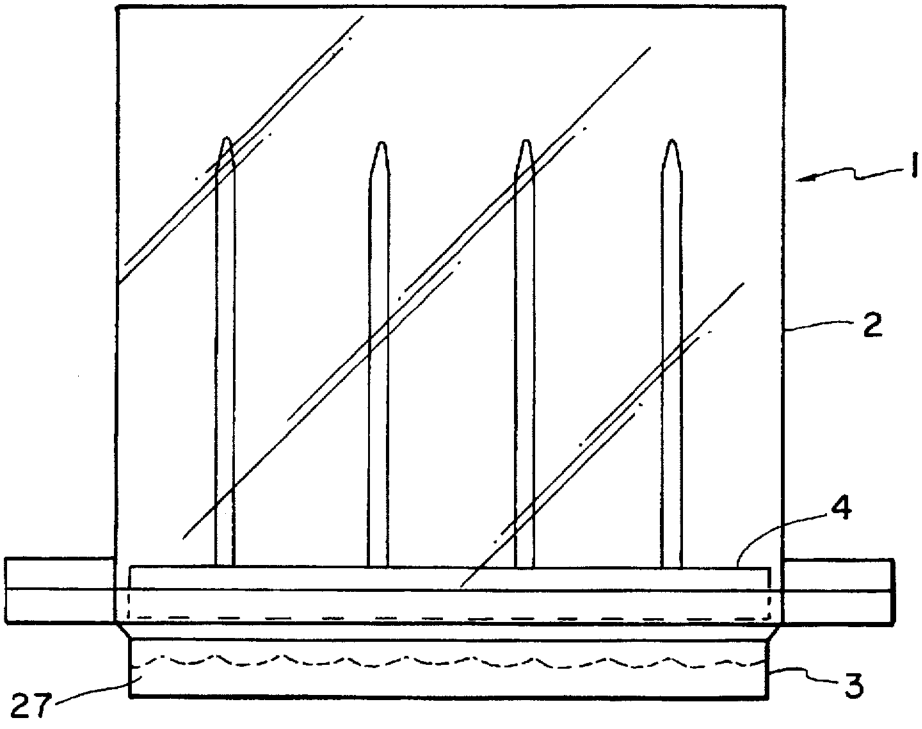
FIG. 1 is a frontal view of the steam cooker.
Figure 2:
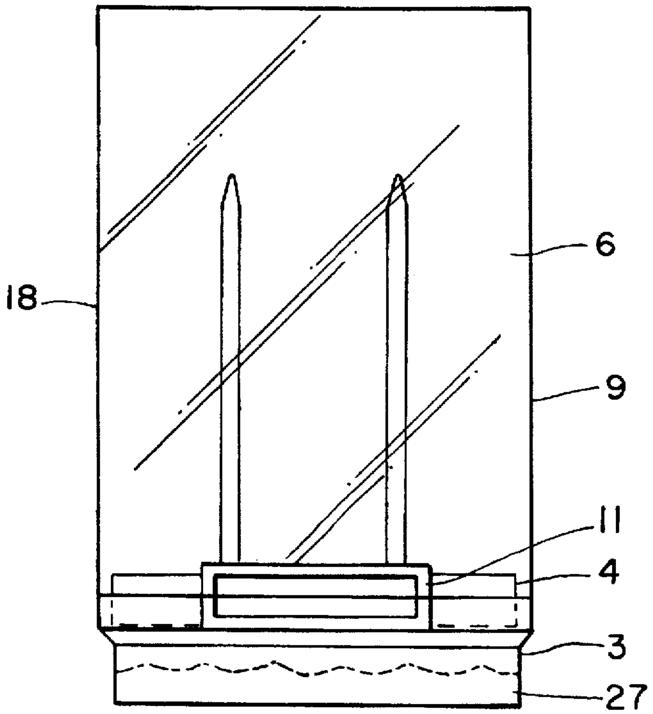
FIG. 2 is a side view of the steam cooker.

Referring to FIG. 1, reference number 1 indicates the steam cooker as a unit. The steam cooker is comprised of various components and will be more fully described hereinafter.

Figure 3:
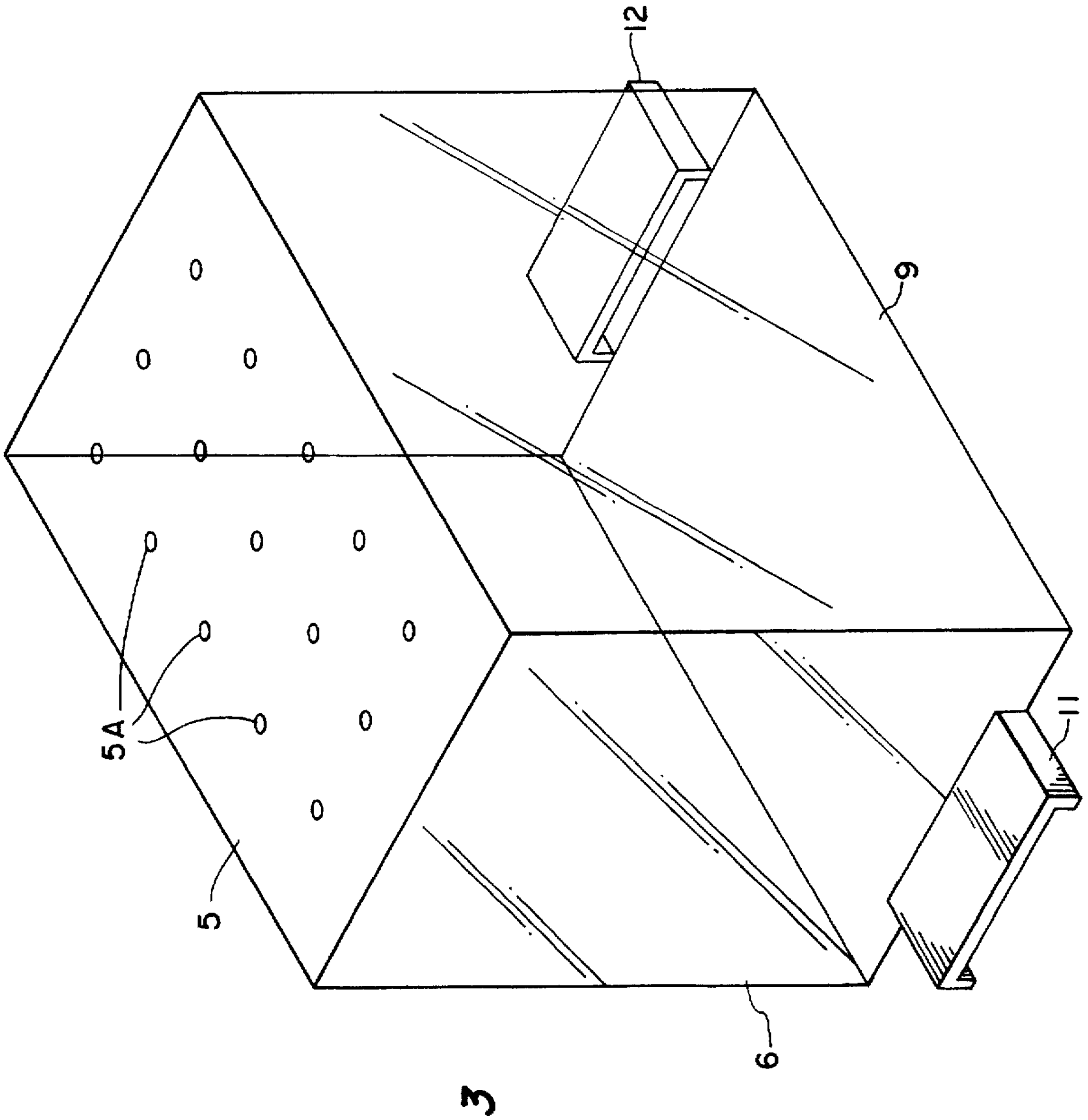
FIG. 3 is a perspective view showing the lid used in the cooker.

The steam cooker includes a lid 2, a base 3, and a tray 4. The lid 2 (FIG.3) includes a top portion 5, two end walls 6, 7, two side walls 8, 9, and two handles 11 and 12 attached to end walls 6, and 7 respectively. The top portion 5 includes a series of apertures 5A through which steam may pass.

Figure 4:
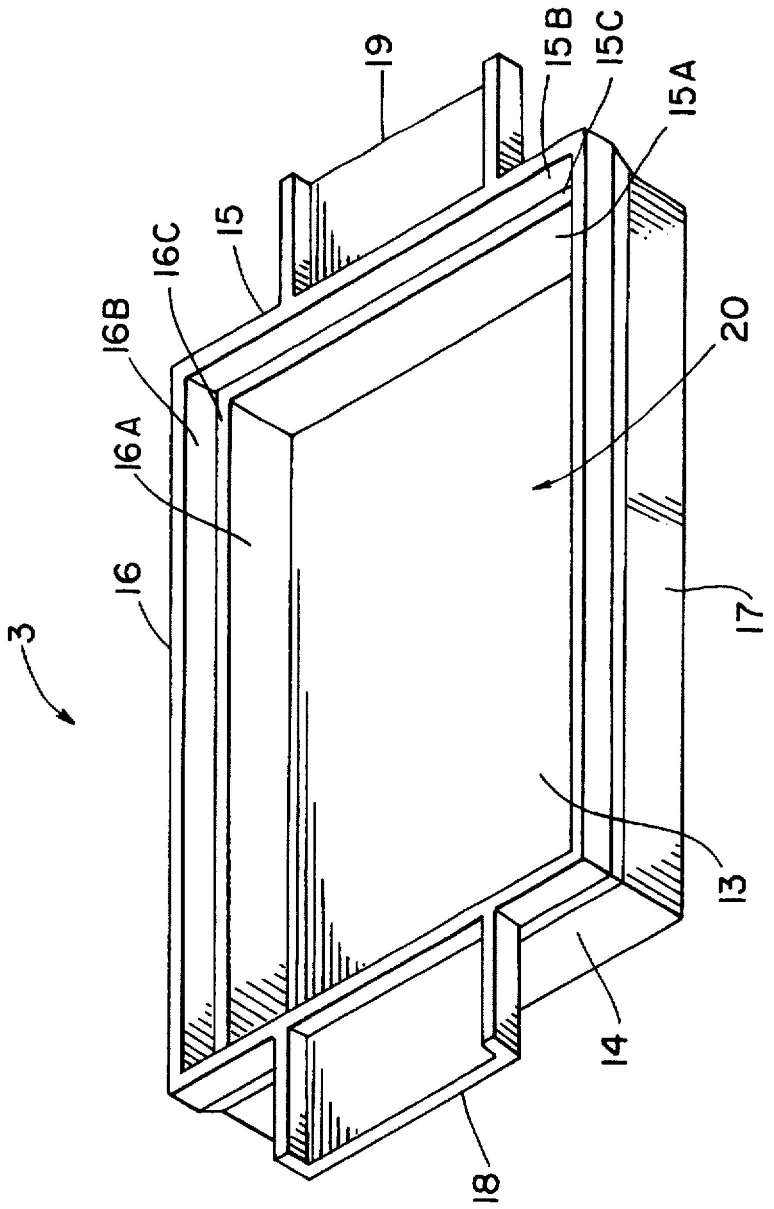
FIG. 4 is a perspective view showing the base unit of the cooker.

The base 4 (FIG. 4) includes a bottom portion 13, two end walls 14, 15; two side walls 16, 17 and two handles 18, 19 attached to end walls 14, 15 respectively.

The bottom portion 13 is connected to the end walls 14, 15 and the side walls 16, 17 so as to form an open container having a cavity 20. The cavity 20 is formed for the purpose of holding liquid 27 to produce the steam for the cooker. The cavity is made up of an upper and lower portion. The lower portion being smaller than the upper portion and formed by the bottom portion 13 and parts 14A and 15A of base end walls 14, 15 and parts 16A, and 17A of base side walls 16, 17. The upper portion of the cavity 20 is formed by parts 14B and 15B of base end walls 14, 15 and parts 16B and 17B of base walls 16, 17, and located immediately adjacent the lower portion. Each base end wall 14 and 15 and each base side wall 16 and 17 include a step portion **14*c*, 15*c*, 16*c* and 17*c*, respectively. The step portions are formed between the respective parts 14A, 15A, 16A, 17A and parts 14B, 15B, 16B, 17B and support the tray 4** of the cooker. The tray can be made of various designs and is utilized to support the food stuff that is being steam cooked.

Figure 5:
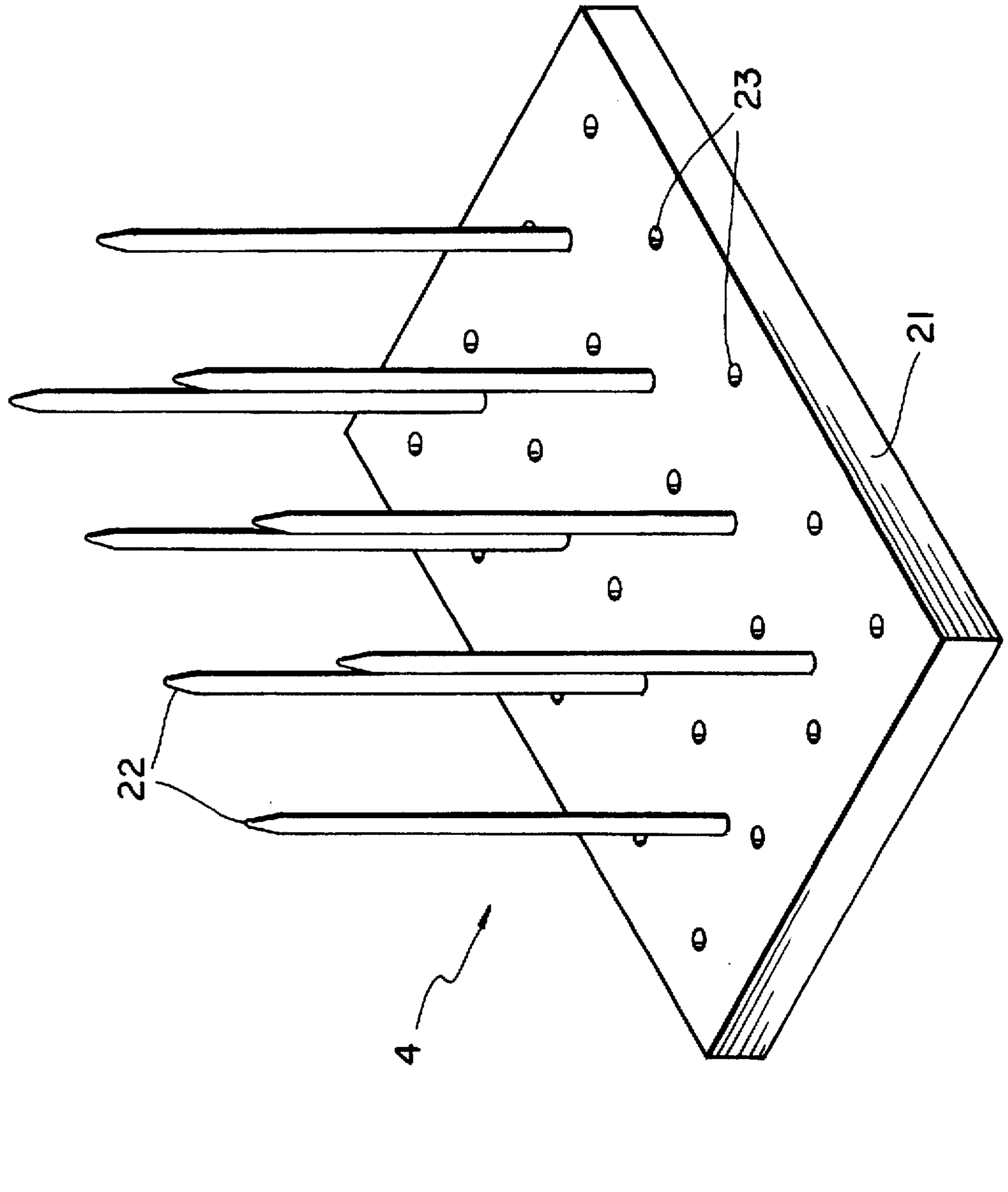
FIG. 5 is a perspective view showing a cooking tray.

The tray 4 (FIG. 5) comprises a base support member 21 and food support members 22. The parallel food support members 22 are located on the base support member such that they extend perpendicular to the member 21. The base support member 21 also includes a series of apertures 23 extending entirely through the base support member. The apertures 23 allow for steam to pass through the tray, past the food stuff and out the apertures 5A in the lid 2.

The tray 4 is designed to fit into the upper portion of the cavity 20 and to contact the steps 14C, 15C, 16C, 17C and be supported thereby. Once the tray 4 is in place the lid 2 is then placed onto the base 3 covering the tray. End and side walls 6, 7, 8, 9 of the lid contact and are supported by end and side walls 14, 15, 16 and 17 of the base.

Figure 6:
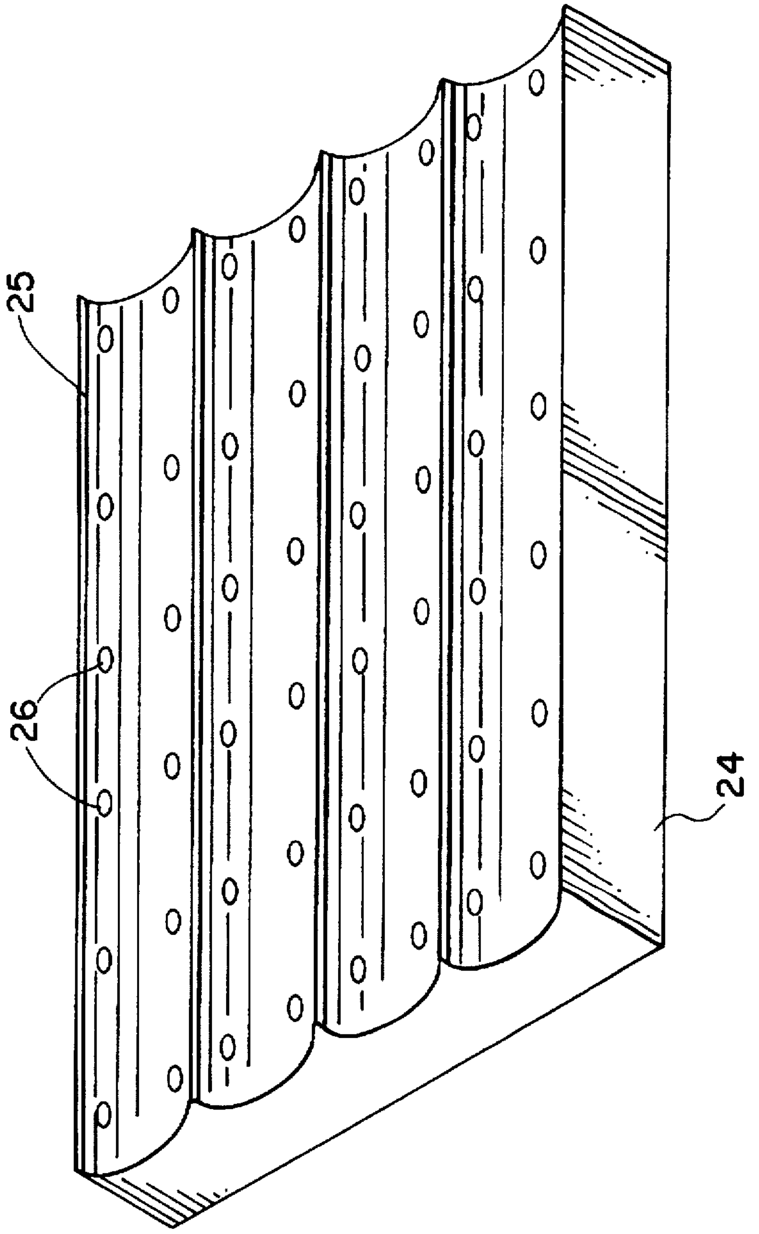
FIG. 6 is a perspective view showing a second cooking tray.

FIG. 6 shows another tray 4 comprised of a base support portion 24, a food support means 25 and a series of apertures 26 running through the tray from the food support means 25 to the base support portion 24. The food support means 25 is made up of a plurality of concave arcuate grooves formed in the tray 4. The arcuate grooves support food items directly therein and run parallel to the base support portion and to each other. The concave arcuate grooves substantially cover the entire surface of the tray 4.

In use, the user begins by removing the lid 2 and tray 4 from the base 3. Then a steam producing liquid 27, most commonly water, is placed in the lower portion of the base cavity 20 and food items, to be steam cooked, are placed on the tray 4. Once that is done the tray 4 is placed on the base 3 at the steps 14C, 15C, 16C, 17C, and then the lid is placed onto the base, over the tray 4 and food items. The entire unit is then placed in a conventional microwave oven. The microwave is activated and the liquid 27 is heated. As the liquid 27 is heated, steam is produced and the steam passes through the tray 4 by means of the apertures 23. After the steam passes through the tray, it passes over the food, thus steam cooking it, and passes out through the lid 2 by means of the apertures 5A.

This steam cooker can be used to cook a wide variety and sizes of foods with the main direction toward hot dogs, sausages, kielbasy and other elongated foods. Further the tray shown in FIG. 6 is intended to steam cook stuffed foods such as cheese hot dogs. The unit can be made of a wide variety of microwavable safe materials, known by those skilled in the art, such as plastic, glass, ceramic, etc.

I claim:

1. A microwave steam cooker which comprises:

a lid having a top portion, wall portions interconnected, and the top portion containing a series of apertures;

a base having a bottom portion, interconnected wall portions, a cavity and a support means; and a tray having a base portion, a support portion, a series of apertures extending through said tray from the base portion to the support portion, and a series of cylindrical food support members attached to the tray and extending a a substantial distance from and perpendicular to the base, and parallel to each other, the tray being supported within the base on the support means.

2. The microwave steam cooker of claim 1 further comprising:

the food support members extend perpendicular to the support surface of the tray.

3. A microwave steam cooker which comprises:

a lid having a top portion, wall portions interconnected, and the top portion containing a series of apertures;

a base having a bottom portion, interconnected wall portions, a cavity and a support means; and a tray having a base portion, a support portion, a series of apertures extending through said tray from the base portion to the support portion, and a series of parallel food support members attached to the tray and extending a substantial distance from and perpendicular to the support surface of the tray.

4. The microwave steam cooker as recited in claim 3 and wherein:

the food support members are cylindrical in form.

5. A microwave steam cooker which comprises:

a lid having a top portion, interconnected wall portions, and a series of apertures in said top portion;

a base having a bottom portion, interconnected wall portions, a cavity and a support portion; and a tray having a base support portion, a food support means, and a series of apertures extending through the tray;

said food support means being a plurality of arcuate grooves wherein said arcuate grooves directly support food items therein, the tray being supported within the base on the support portion.

6. The microwave steam cooker of claim 5, wherein:

the arcuate grooves are concave.

7. The arcuate microwave steam cooker of claim 6, wherein:

the grooves run parallel to the base portion and cover the entire support surface.

8. The microwave steam cooker of claim 5, wherein:

the grooves run parallel to the base portion and cover over the entire support surface.

* * * * *